United States Patent Office 3,161,817
Patented Dec. 15, 1964

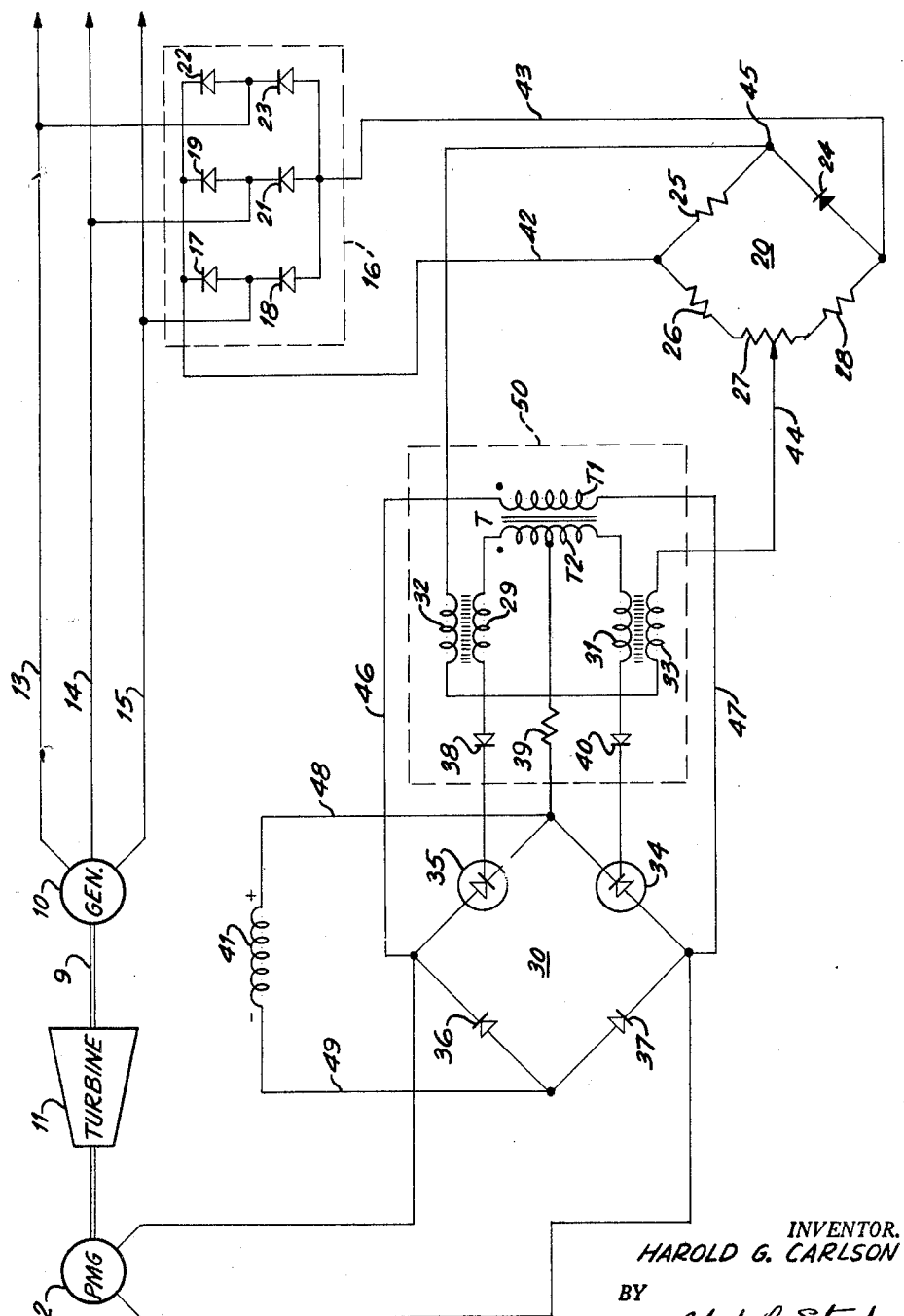

3,161,817
MEANS FOR SUPPLYING FULL WAVE RECTI-
FIED CURRENT TO THE FIELD OF AN A.C.
GENERATOR
Harold G. Carlson, Waynesboro, Va., assignor to General
Electric Company, a corporation of New York
Filed Apr. 18, 1961, Ser. No. 103,773
6 Claims. (Cl. 322—28)

This invention relates to generator excitation systems, and more particularly, to generator excitation systems affording improved automatic voltage regulation of alternating dynamoelectric machines.

There is increasing demand for generating equipment which may be easily moved from one area to another. Obviously, such equipment should advantageously be of light weight and considerable durability in order to render it easily and safely transportable. In general, generating equipment tends to be heavy due to the large amount of metal necessarily present. However, gains in weight reduction are possible by modifications of the accessory equipment which is required to control the generator and maintain it within operating specifications.

An object of the invention is to provide a light weight and reliable generator excitation system affording good voltage regulation.

Numerous means have been developed for regulating the output of alternating current generators, including those which use mechanical error detection and amplification circuits and those which use electrical error detection and amplification circuits. The former type is generally characterized by relatively slow response to variations in load, whereas the latter type is characterized by continuous and rapid response to load variations. When stability of output is important, continuous or dynamic regulation is often a necessity.

Another object of the invention is to provide a dynamic voltage regulator that rapidly responds to slight variations in the output of a generator and thereupon initiates compensating action to stabilize the output at a desired value.

Relatively recent developments in the semi-conductor art have furnished numerous components having extremely high reliablility and life expectancy. These components, due to their construction, are also of light weight and small size and may be assembled in small, easily handled packages. Obviously, the response time of any regulation system is dependent upon the particular circuit configuration adopted and this in turn is dependent upon the elements employed in the system. Semi-conductive elements having fast switching qualities, such as for instance the silicon controlled rectifier, make it possible to develop voltage regulation systems having exceptional response time.

A feature of the present invention resides in the use of silicon controlled rectifiers in a full wave rectifying bridge interposed between the output of an alternating current exciter and the field of a regulated alternating current generator.

Another feature of the invention relates to the use of a magnetic amplifier responsive to variations in the output of the alternating current generator to control the aforementioned silicon controlled rectifiers.

In general, the invention comprises means for sensing the output of an alternating current generator, comparing it with a reference voltage, and controlling the field winding of the generator in response to such comparison to secure specifically desired voltage characteristics. In accordance with the illustrative embodiment described hereinafter, a sensing means is connected to the generator output for providing a signal to a voltage comparison circuit. In the voltage comparison circuit the signal is compared with a fixed reference voltage and an error voltage is produced. The error voltage is then used to control a unique combination of a self-saturating magnetic amplifier and a rectifier bridge containing two silicon controlled rectifiers, the rectifier bridge being used to supply current to the field winding of the alternating current generator.

The features of the invention which are believed to be novel are set forth with particularity in the appended claims. The invention itself, however, both as to its organization and method of operation, together with further objects and advantages thereof, may best be understood by reference to the following description taken in connection with the accompanying drawing wherein an illustrative embodiment is presented in schematic form.

A voltage regulated generator 10 is shown in the upper left quadrant of the drawing. It is driven by a turbine 11 upon the shaft of which is also mounted a permanent magnet generator 12. The output of generator 10 is distributed over conductors 13, 14, and 15 to a load, or loads, not shown.

A voltage sensing means 16 is connected to each line conductor and functions to establish a D.C. voltage between conductors 42 and 43 that is proportional to the average voltage output from generator 10. A reference voltage bridge circuit 20 is connected between conductors 42 and 43 and operates to generate an error signal indicative of the amount of deviation between the actual generator output and the desired generator output. This error signal is then used to control a self-saturating magnetic amplifier circuit 50, which in turn controls the current delivered to the field winding 41 of generator 10 via rectifying bridge circuit 30.

A more detailed description of the circuit structure and its operation is as follows:

The output of generator 10 is assumed to be a three-phase voltage appearing on lines 13, 14, and 15. This output is continuously monitored by voltage sensing means 16 and converted into a direct current having a magnitude proportional to that of generator 10 output. Voltage sensing means 16 is a three-phase full wave rectifier circuit comprising six rectifiers connected in series pairs, 17, 18; 19, 21; and 22, 23, the diodes of each pair being similarly poled as indicated. The junction of each pair is connected to a respective one of conductors 13, 14, and 15 and the remaining anodes of each pair are connected together and to conductor 43 while the remaining cathodes are connected together and to conductor 42. In view of the described orientation of rectifiers, the D.C. voltage appearing between conductors 42 and 43 is always polarized with conductor 42 positive with respect to conductor 43. As the output of generator 10 varies, the magnitude of the D.C. voltage varies proportionately.

The fluctuating voltage between conductors 42 and 43 is applied to diagonally opposite corners of reference voltage bridge 20 wherein it is converted to an error signal used for control of the current supplied to generator field winding 41. Reference voltage bridge 20 comprises three fixed resistances 25, 26, and 28, a potentiometer 27, and Zener diode 24. The circuit connections are arranged in two circuit paths bridging leads 42 and 43; specifically, a first series circuit comprising resistor 26, potentiometer 27, and resistor 28, and a second series circuit comprising resistor 25 and Zener diode 24. Zener diode 24 is polarized to be reverse-biased by the voltage normally occurring between conductors 42 and 43, i.e., biased in the direction in which the diode is non-conductive at voltages below the breakdown voltage.

Zener diode 24 functions to provide a stable reference voltage for reference voltage bridge 20. As well known, when the reverse voltage across a Zener diode exceeds the breakdown potential of the diode, the normally high back resistance of the diode drops to a low value and the current increases, limited principally by external circuit resistance. Additional increases in the applied voltage result in proportionate current increase but the voltage drop across the diode remains substantially constant. In reference voltage bridge 20 a sufficiently high reverse voltage is applied to exceed the breakdown of Zener diode 24 and consequently, the voltage appearing at its cathode, illustrated as point 45 on the drawing is always a fixed magnitude greater than the voltage appearing on lead 43. With point 45 as a reference, any variations in the output of the generator, as reflected in the rectified voltage between conductors 42 and 43, modifies the degree of balance of the reference voltage bridge circuit.

The excitation system is initially adjusted to provide the desired voltage output by varying the contact on potentiometer 27. As hereinafter described, this modifies the current supplied to generator field winding 41 and therefore controls the generator output. After the initial adjustment is made, a particular voltage difference will be present between lead 44 and point 45. If it be assumed for convenience that this difference is initially zero, any subsequent increase in generator output will give rise to a positive voltage difference between lead 44 and point 45 and any decrease in generator output will give rise to a negative voltage difference between lead 44 and point 45, respectively. In the following discussion this voltage difference between lead 44 and point 45 will be referred to as the error voltage because its polarity and magnitude are directly relatable to the direction and magnitude of any deviation in the generator output from a selected norm.

The error voltage created at reference voltage bridge 20 is serially applied to the control windings 32 and 33 of the self-saturating magnetic amplifier circuit. Obviously, the direction and magnitude of current flow through control windings 32 and 33 are determined by the deviation of the generator output from normal.

As illustrated, the self-saturating magnetic amplifier configuration comprises two gate windings 29 and 31, and two control windings 32 and 33. Each gate winding is serially connected with a rectifier and common resistor 39 across a respective one-half of secondary winding T2 of transformer T. The primary T1 of transformer T is energized from the constant output of permanent magnet generator 12. In accordance with normal self-saturated magnetic amplifier operation when no current exists in control windings 32 and 33, current in gate windings 29 and 31 produces saturation in the respective cores a predetermined time after application thereof, and a current pulse is then produced. If a core is partially saturated in an aiding direction by current in the control winding, the current pulse will be produced in a shorter time than with a neutral core condition. On the other hand, if the core is partially saturated in an opposing direction by current in the control winding, the current pulse will be delivered at some time later than with a neutral core condition. The increased or decreased time from the time required in a neutral core condition is directly proportional to the amount of partial saturation. In the instant illustrative embodiment the partial saturation caused by the current in the control windings is proportional to the error voltage appearing across reference voltage bridge 20.

Although the schematic shows separate cores for the magnetic amplifier, conventional structures often employ double cores and specific winding configurations in order to yield the most efficient operating units. Variations from the illustrated structural arrangement which perform the described functions are within the scope of the present invention.

The effect of the current pulses generated by self-saturating magnetic amplifier 50 upon the current applied to generator field winding 41, may now be considered. Permanent magnet generator 12 produces an alternating current in response to the rotation of shaft 9. This alternating current is applied to rectifying bridge 30 and also over conductors 46 and 47 to the primary T1 of transformer T. Full wave rectifying bridge 30 comprises two conventional rectifiers, 36 and 37, and two silicon controlled rectifiers, 34 and 35. The gate electrodes of the silicon controlled rectifiers are connected to receive the above described current pulses, from the magnetic amplifier, through conventional rectifiers 40 and 38. Full wave rectifier 30 is interposed between permanent magnet generator 12 and generator field winding 41. The current paths from permanent magnetic generator 12 to field winding 41 each include one silicon controlled rectifier and one conventional rectifier, i.e., rectifiers 36 and 34 during one half cycle, and rectifiers 35 and 37 during the opposite half cycle. Thus, a silicon controlled rectifier must be in its conducting state in order to permit rectified current to flow through field winding 41.

It is characteristic of silicon controlled rectifiers that current conduction occurs under a forward biasing condition when either a breakdown voltage is attained or when a triggering potential is applied to the gate electrodes thereof. Silicon controlled rectifiers are used having a breakdown voltage in excess of that created by permanent magnet generator 12 and which, consequently, conduct only upon application of a triggering potential to their gate electrodes.

During the positive half cycle of the alternating current generated by permanent magnet generator 12 a positive voltage is applied to the anode of silicon controlled rectifier 35 and to the dotted terminal of transformer primary T1. Controlled rectifier 35 will not conduct at this time because the voltage does not exceed its breakdown potential. The application of a positive voltage to the dotted terminal of transformer primary T1 causes a voltage to be induced in secondary winding T2 which is polarized positive at the dotted terminal thereof. The induced voltage creates a current flow in the circuit comprising gate winding 29 of the magnetic amplifier, rectifier 38, gate and cathode electrodes of silicon controlled rectifier 35, resistor 39, and the center tap of transformer secondary T2. Assuming that the output voltage of generator 10 is correct and consequently that no error voltage has been generated across reference voltage bridge 20, there is no current flow through control winding 32 and consequently no partial saturation of the core of the magnetic amplifier. The current created by the induced voltage in transformer secondary T2 is confronted by a relatively large impedance circuit due to the inductance of gate winding 29. At some time during the early portion of the instant half cycle the voltage saturates the core of the magnetic amplifier. Upon saturation, the impedance of gate winding 29 rapidly diminishes and a sharp, well-defined current pulse, is transmitted through rectifier 38 to the gate electrode of silicon controlled rectifier 35. As well known, the current pulse supplied by such a magnetic amplifier has a steep wave front and is delivered a predetermined time after initial application of a voltage of predetermined magnitude to the gate winding.

The current pulse applied to controlled rectifier 35 is effective to trigger this device into a high conduction state. Consequently, a path is created from permanent magnet generator 12 comprising controlled rectifier 35, conductor 48, field winding 41, conductor 49, and rectifier 37. Once the controlled rectifier has been triggered to its current conduction state the gate electrode loses control and conduction continues until the anode to cathode potential across the controlled rectifier is reversed. This occurs on the succeeding half cycle of the alternating current supplied by permanent magnet generator 12.

On the succeeding half cycle of current from permanent magnet generator 12 an identical operating sequence occurs, the components involved in this case being the lower portion of secondary winding T2, gate winding 31, rectifier 40, silicon controlled rectifier 34, and resistor 39. Due to the action of full wave rectifying bridge 30 current will be supplied in the same direction to field winding 41.

The previous circuit description makes clear that voltage is applied to field winding 41 only during a controlled period. This period is controlled by self-saturating magnetic amplifier 50. As described hereinbefore, when the generator output voltage falls below a desired level an error signal is created across reference voltage bridge 20 inducing a current flow through the control windings 32 and 33 of the self-saturating magnetic amplifier. This current flow is in a direction to produce partial saturation of the magnetic amplifier in a direction aiding that produced by the gate windings and consequently the triggering current pulse supplied thereby occurs sooner than under normal circumstances. This means that the controlled rectifiers are triggered to their conduction state earlier in the cycle of the current from permanent magnet generator 12 and consequently voltage is applied to field winding 41 for a longer period of time. The enhanced field current is effective to increase the generator 10 output. The increased generator output modifies the error voltage until the generator is stabilized at the desired level.

In the event the output of generator 10 exceeds a desired value an error voltage is produced in reference voltage bridge 20 causing a current flow in control windings 32 and 33 which results in partial saturation of the cores of the magnetic amplifier in a direction opposing that produced by the gate windings. This opposing partial saturation must be overcome before the applied voltage saturates the core in the desired direction and consequently the triggering impulse produced by the magnetic amplifier occurs some time later than normal. Under these conditions voltage is applied to generator field winding 41 for a shorter period of time than under normal conditions and consequently generator 10 output will tend to decrease. The instant regulatory scheme is thus applicable for variations of generator output voltage either above or below that desired.

The previous detailed circuit description assumed that the reference voltage bridge was initially balanced when the output was normal. This permitted a circuit analysis wherein increases in output voltage produced positive error signals and decreases in output voltage produced negative error signals. If the initial adjustment of the excitation system by setting potentiometer 27 does not result in a balanced bridge, it merely indicates that the field current required to maintain the desired norm is obtained by modifying the initial saturation of the magnetic amplifier. Subsequent changes in generator output will be reflected by changes in the control winding current in a manner similar to that already considered.

The described circuit may be modified by inserting limiting resistors between the gate and cathode electrodes of each controlled rectifier. Such resistors will allow exciting current to flow through gate windings 29 and 31 before the controlled rectifiers are triggered without going through the controlled rectifiers, thus offering protection against accidental firing before saturation of the magnetic amplifier.

While there has been shown a particular embodiment of this invention it will, of course, be understood that it is not wished to be limited thereto since different modifications may be made both in the circuit arrangements and in the instrumentalities employed, and it is contemplated in the appended claims to cover any such modifications as fall within the true spirit and scope of the invention.

What is claimed as new and desired to be secured by Letters Patent of the United States is:

1. In a regulating system for an alternating current generator having a field winding, the combination of a self-saturating magnetic amplifier having direct current control windings for modifying the degree of saturation thereof and being designed to yield an output when current is applied during saturation, means to supply direct current in said control windings varying in response to the output of said generator, an alternating current source, normally disabled rectifying means supplied by said alternating current source and connected to supply full-wave rectified current to said field winding, and means responsive to the output of said magnetic amplifier for enabling said rectifying means for a selected period of time during each half cycle of alternating current from said source.

2. An alternating generator field excitation system comprising a source of alternating current, normally disabled full-wave rectifying means supplied by said alternating current and providing direct current excitation for the field winding of said generator, and control means responsive to the output of said generator for selectively enabling said rectifying means for a period of time in each half cycle of alternating current supplied thereto in accordance with the field strength required to stabilize said output at a preselected voltage.

3. In a regulating system for an alternating current generator having a field winding, the combination of sensing means connected to the output of said generator and responsive to yield voltages proportional to the magnitude of said output, means for establishing a reference voltage level, a self-saturating magnetic amplifier having direct current control windings for modifying the degree of saturation thereof and being designed to yield an output when currents are applied during saturation, means for comparing said proportional voltages with said reference voltage level and energizing said direct current control windings with a signal proportional to the difference therebetween, an alternating current source, normally disabled full-wave rectifying means supplied by said alternating current source and connected to said field windings, and means responsive to the output of said magnetic amplifier for enabling said rectifying means for a selected period of time during each half cycle of alternating current from said source.

4. In a regulating system for a three-phase alternating current generator having a field winding, the combination of a three-phase rectifier adapted to be connected to the output of said generator and responsive to the voltage produced thereby to yield direct current voltages proportional to the output voltages thereof, a voltage reference bridge including means for providing a predetermined voltage level for comparison with said D.C. voltages, said voltage reference bridge being adapted to produce a voltage proportional to the magnitude of variation between said predetermined voltage level and said direct current voltages, a self-saturating magnetic amplifier having direct current control windings energized by said voltage conditions for modifying the degree of saturation thereof by an order of magnitude determined by the amplitude of the current therein, a constant source of alternating current, means responsive to said alternating current for supplying rectified alternating current to said magnetic amplifier having a polarity to increase saturation thereof, a full wave rectifying bridge circuit connected to said field winding, said full wave rectifying bridge circuit being supplied by said alternating current source and having normally blocked unidirectional current conducting means in each rectifying path, and means operative in response to saturation of said magnetic amplifier for unblocking said unidirectional current conducting means.

5. An alternating current generator field excitation system comprising a source of alternating current, a first pair of unidirectional current conducting means serially connected in opposition and shunting said source of alternating current, a second pair of unidirectional current conducting means serially connected in opposition and shunting said source of alternating current, said second pair of unidirectional current conducting means comprising normally nonconducting silicon controlled rectifiers operative in response to a signal to assume a conducting state, and control means responsive to the output of said generator for selectively applying signals to said silicon controlled rectifiers for a period of time in each half cycle of alternating current supplied thereto in accordance with the field strength required to stabilize said output at a preselected voltage.

6. An alternating current generator field excitation system comprising a source of alternating current, a rectifying circuit bridging said source of alternating current having a pair of anode-to-anode connected unidirectional current conducting means and a pair of cathode-to-cathode connected unidirectional current conducting means in parallel, said cathode-to-cathode connected unidirectional curent conducting means being normally disabled, a self-saturating magnetic amplifier supplied by said source of alternating current and having control windings for modifying the degree of saturation thereof, means responsive to the output of said generator for controlling the amount of current in said control windings, and means responsive to saturation of said magnetic amplifier selectively to enable said cathode-to-cathode connected unidirectional current conducting means for a period of time in each half cycle of alternating current supplied thereto in accordance with the field strength required to stabilize said output at a preselected voltage.

References Cited in the file of this patent
UNITED STATES PATENTS

| | | |
|---|---|---|
| 2,791,740 | McKenna et al. | May 7, 1957 |
| 3,009,091 | Hallidy | Nov. 14, 1961 |
| 3,032,701 | Krausz | May 1, 1962 |